Jan. 15, 1935.   A. S. WALTON   1,988,405
DRIVING MECHANISM
Filed Feb. 25, 1933
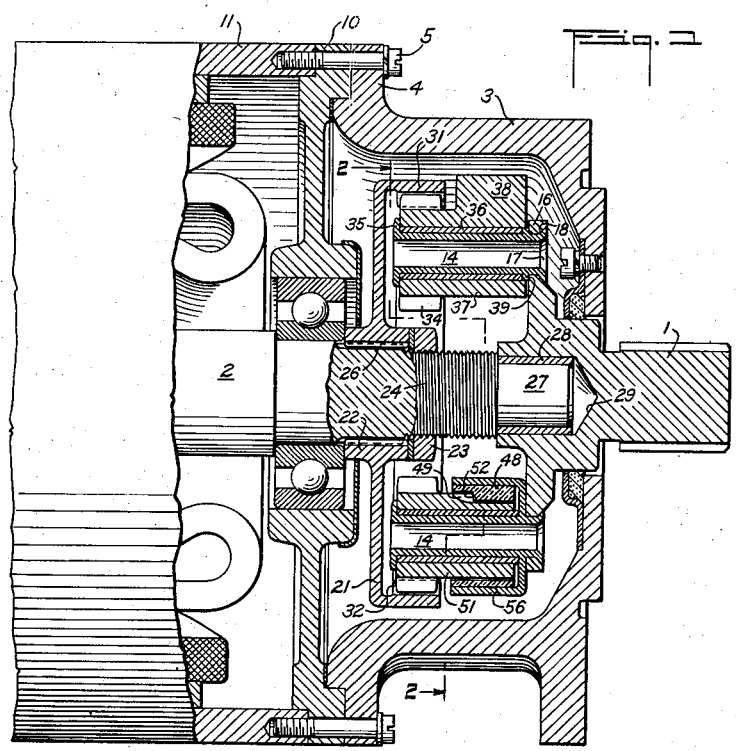
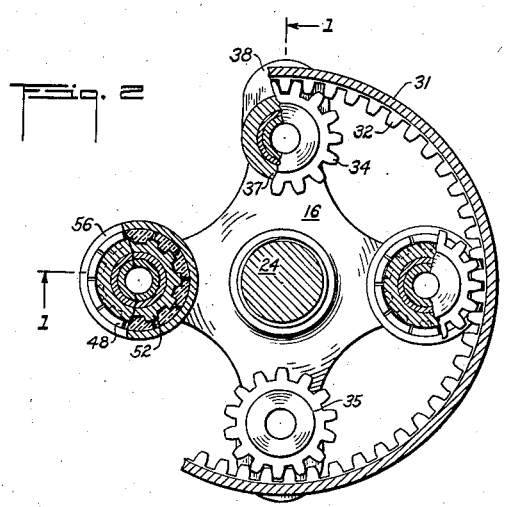
INVENTOR.
Albert S. Walton
BY
ATTORNEY.

Patented Jan. 15, 1935

1,988,405

UNITED STATES PATENT OFFICE 1,988,405

DRIVING MECHANISM

Albert S. Walton, East Orange, N. J., assignor, by mesne assignments, to Eclipse Aviation Corporation, East Orange, N. J., a corporation of New Jersey Application February 25, 1933, Serial No. 658,604

16 Claims. (Cl. 74—260)

This invention relates to driving mechanism, and particularly to driving mechanism in which a certain amount of relative rotation is possible, as between the driving and driven elements.

An object of the invention is to provide a system of the foregoing character in which connection between the driving and driven elements is effected by means of a plurality of constantly meshed gears which, although subject to relative rotation under certain conditions, are also capable of becoming locked to establish a direct one-to-one drive.

In the accompanying drawing the invention is shown applied to a cycloidal gear train of the character disclosed in Patent No. 1,949,203 of Clinton H. Havill, granted Feb. 27, 1934, and including a plurality of driving wheels or gears dynamically unbalanced with respect to their individual axes of rotation, and adapted to rotate within a common driven wheel constituting a circular track therefor under certain conditions, but locked thereto for rotation as an integral unit therewith under certain other conditions.

Such a dynamically unbalanced gear train functions properly as a resilient coupling so long as the driving and driven shafts run at the same average speed. If this condition is departed from, however, to any extent, it becomes difficult to bring the device back to the one-to-one drive relationship, because of the tendency to prolonged precession (that is, rotation about their individual axes) on the part of the unbalanced elements of the coupling. It follows that additional means for dampening such precession is to be desired, and it is an object of the present invention to accomplish this result by providing a friction factor which, by reason of its response to centrifugal force, affords the proper degree of opposition to the tendency to prolonged precession, and thus facilitates a prompt return to the one-to-one drive relationship, following absorption of any shock sufficient to cause a temporary departure therefrom.

In the preferred embodiment of the invention as herein illustrated this friction factor responds to centrifugal force in such a manner that its effectiveness is directly proportional to the degree of relative rotation or precession.

Another object is to provide a driving mechanism of novel construction in which the component parts are compactly and symmetrically positioned, and readily accessible for inspection or repair.

Another object is to provide novel friction controlled gear mechanism for drivably connecting a prime mover, such as an engine, with an electric generator or other member to be driven.

Other objects and advantages to be derived from the use of the invention herein disclosed reside in the inter-relation and method of operation of the parts and will become apparent upon inspection of the following specification when read with reference to the accompanying drawing wherein the preferred embodiment of the invention is illustrated. It is to be expressly understood, however, that the drawing is for the purpose of illustration only, and is not to be construed as a definition of the limits of the invention, reference being had for this purpose to the appended claims.

In the drawing,

Fig. 1 is a central longitudinal section through a device embodying the invention as it appears when applied as a drive for a generator; and Fig. 2 is a transverse sectional view taken along the line 2—2 of Fig. 1.

Referring to the drawing, and particularly to Fig. 1, the invention is illustrated as embodied in a driving mechanism comprising a driving member 1, a driven shaft 2, and a plurality of intermediate members of novel construction drivably connecting the members 1 and 2 and enclosed within a casing 3 having a flange 4 provided with openings through which suitable fastening means 5 may be inserted for attachment to an end plate 10 of the housing 11 of the generator or other device to be driven.

As above suggested, the novel means for coupling shafts 1 and 2 preferably includes a plurality of hollow driving pins 14 projecting radially from a disc 16 to which they are rigidly secured as by upsetting the ends 17 thereof in the counterbored portions 18 of said disc. These pins 14 are preferably provided at points equally spaced from the center of rotation of the disc and at equal angular intervals, as indicated in Fig. 2. A similar disc 21, having a hub 22 splined to the driven shaft 2, is adjustably held in place thereon by a nut 23 engaging the threaded portion 24 of the shaft 2, the said threaded portion being provided intermediate the splined portion 26 and the reduced end portion 27 piloted with the assistance of a friction reducing bearing 28, in the socketed portion 29 of the driving member 1.

As shown, the disc 21 has a rim 31 on the inner surface of which are formed teeth 32 constituting an annular gear adapted to be driven by a plurality of pinions 34 constantly in mesh with the teeth 32 and rotatable on sleeves 36 through which the above described mounting pins 14 extend, the sleeves 36 being fixed axially between flanges 35 and 39 on pins 14. It will be noted that certain of these pinions 34 have lateral extensions 37 integral therewith, said extensions being eccentrically formed with respect to the axis of the associated pin 14 so as to render the pinions 34 dynamically unbalanced during operation, and thus create a tendency for the pinions to become locked to the annular gear 31, rather than continue in free planetary movement about said annular gear as an orbital track, such locking tendency being due, of course, to the action of centrifugal force tending to hold the pinion in such positions angularly as to maintain the center of mass of their eccentric portions 38 at the greatest distance from the axis of rotation of the driving disc 16. Thus there is maintained a one-to-one drive between the disc 16 and the driven shaft 2 except for occasional departures therefrom by reason of suddenly applied torque impulses under which the pinions may yield somewhat, thus providing the desired flexibility.

As above explained, however, there is a tendency on the part of the pinions 34 to precess to an excessive extent, particularly during the period prior to attainment of sufficient speed to produce the required centrifugal force necessary for the locking action. To combat this tendency, I have provided means interposed between certain of the pinions and the corresponding driving pins 14 adapted to exercise a frictional restraint operating to resist rotation of the pinions about their individual axes, the degree of such restraint being directly proportional to the speed of rotation of the pinions about their own axes, plus the rotation about the axis of the orbit gear 32.

In the preferred embodiment as shown, such frictional restraint is produced by providing a plurality of friction shoes 48 associated with one or more of the pinions 34, the pinions so equipped being provided with longitudinal grooves 49 in the laterally-extending hubs 51 thereof, which hubs differ from the extensions 37 of the other pinions 34 in that they lack the eccentric formation indicated on the latter at 38. Projecting into longitudinal grooves 49 are tongues 52 on the inner surface of the friction shoes 48, the shoes 48 and the pinion 34 being thus held in locked relation to each other. Surrounding the friction shoes 48 and adapted to be frictionally engaged thereby with a variable degree of pressure depending upon variations in the centrifugal force, is an outer sleeve or drum 56, which, as shown, is in the nature of a cup-shaped element integral with the associated pin 14.

From the foregoing it is apparent that when the driving disc 16 is started, the friction shoes 48 will have little effect on the pinions thus equipped, as there is no accumulation of centrifugal force to hold them firmly in engagement with the inner surface of the associated drum 56. For the same reason the eccentric portion 38 of the other pinions will also be relatively ineffective, and all pinions will be comparatively free to rotate about their individual axes as well as about the axis of the driven shaft 2. It follows that during the period of relatively intense starting impulse on the part of the driving element only a minor part of the acceleration will be transmitted to the driven apparatus. After a certain speed has been reached, however, the friction shoes 48 acquire sufficient centrifugal impetus not only about their own axes, but also about the axis of the drive shaft, to become sufficiently effective in assisting the unbalanced elements 38 in locking the pinions to the annular gear 32 for establishment of a one-to-one driving ratio. During each subsequent period of temporary overload, the necessary flexibility is obtained by reason of the temporary yielding of the pinions to the urge to rotate about their individual axes. However, as the two shafts depart from the same speed ratio (so that the pinions tend to "precess", that is, rotate very rapidly about their own axes) there is automatically set up a large restoring force due to the combined action of the friction elements 48 and the unbalanced parts 38; and immediately upon cessation of the temporary overload this restoring force nullifies the precessing tendency and restores the substantially locked condition. This substantially locked condition, therefore, continues indefinitely, except for the slight instantaneous relative rotation of drive and driven shafts; and therefore under such conditions the restraining friction is due almost entirely to the rotation about the axis of the driven shaft, and occurs only on those shoes 48 which are on the outside. Since this friction area is relatively small, only relatively little friction occurs for normal flexible operation, and long life is assured.

There is thus provided a novel driving mechanism which, in the disclosed embodiment, is effective to achieve the objects above enumerated, and is relatively inexpensive to manufacture, readily assembled or disassembled, and possesses the further desirable quality that it can be adapted to a variety of uses and applications. Thus, for example, although especially useful for driving a generator or other dynamo electric machine or accessory of the automotive vehicle, it may also be applied to minimize torsional vibration in any machinery where the prime mover is subject to rapidly pulsating variations in speed.

While the embodiment of the invention herein disclosed and illustrated possesses a high degree of merit in the respects above enumerated, it is nevertheless contemplated that changes in construction and arrangement of parts will suggest themselves to persons skilled in the art in the light of the foregoing disclosure; and accordingly latitude for such changes is provided for in the broadest of the appended claims.

What is claimed is:

1. In a device of the class described, a driving member; a driven member; a gear train interposed between said members; said gear train comprising a plurality of driving gears and a driven gear constantly meshed therewith but rotatable relatively thereto, means including a segmental friction device surrounding certain of said driving gears and acting to restrain relative rotation between said gears, and additional means acting on another of said driving gears to supplement the restraining action of said friction device.

2. In a device of the class described, a driving member, a driven member; a gear train interposed between said members; said gear train comprising a plurality of driving gears and a driven gear constantly meshed therewith but rotatable relatively thereto, centrifugally responsive means acting on certain of said driving gears to lock all of said driving gears against rotation relatively to said driven gear, and friction means including a cup-shaped element rotatably supporting another of said driving gears and containing a plurality of friction shoes engageable with the inner cylindrical surface of said cup-shaped element for supplementing the locking action of said centrifugally responsive means.

3. In a device of the class described, a driving member, a driven member, a gear train interposed between said members, said gear train comprising a plurality of driving gears and a driven gear constantly meshed therewith but rotatable relatively thereto, certain of said driving gears being weighted asymmetrically to create a tendency opposing relative rotation between said driving gears and driven gear, and means including a cup-shaped element rotatably supporting certain of said driving gears and containing a plurality of friction shoes engageable with the inner cylindrical surface thereof to supplement opposing action of said asymmetrically weighted means.

4. In a driving mechanism, a rotatable driving cage, a driven shaft, a plurality of driving wheels mounted on said cage, a driven wheel constantly engaged by each of said driving wheels and rotatable therewith, and means including a cup shaped element rotatably supporting one of said driving wheels and containing a plurality of friction shoes engageable with the inner cylindrical surface thereof to oppose rotation of all of said driving wheels relatively to said driven wheel.

5. In a driving mechanism, a rotatable driving cage, a driven shaft, a plurality of driving wheels mounted on said cage, a driven wheel constantly engaged by each of said driving wheels and rotatable therewith, and means including a cup-shaped element rotatably supporting one of said driving wheels and containing a plurality of friction shoes engageable with the inner cylindrical surface thereof to oppose rotation of any of said driving wheels about their individual axes.

6. In a driving mechanism, a rotatable driving cage, a driven shaft, a plurality of driving wheels mounted on said cage, a driven wheel constantly engaged by each of said driving wheels and rotatable therewith, and means including a cup-shaped element rotatably supporting one of said driving wheels and containing a plurality of friction shoes engageable with the inner cylindrical surface thereof constantly tending to lock said driving wheels to said driven wheel to establish a one-to-one speed ratio therebetween.

7. In a driving mechanism, a rotatable driving cage, a driven shaft, a plurality of driving wheels mounted on said cage, a driven wheel constantly engaged by each of said driving wheels and rotatable therewith, means including a cup shaped element rotatably supporting one of said driving wheels and containing a plurality of friction shoes engageable with the inner cylindrical surface thereof to oppose rotation of all of said driving wheels relatively to said driven wheel, and means responsive to the speed of said driving cage for supplementing the action of said friction device.

8. In a driving mechanism, a rotatable driving cage, a driven shaft, a plurality of driving wheels mounted on said cage, a driven wheel constantly engaged by each of said driving wheels and rotatable therewith, means including a cup-shaped element rotatably supporting one of said driving wheels and containing a plurality of friction shoes engageable with the inner cylindrical surface thereof to oppose rotation of any of said driving wheels about their individual axes, and means responsive to the speed of said driving cage for supplementing the action of said friction device.

9. In a driving mechanism, a rotatable driving cage, a driven shaft, a plurality of driving wheels mounted on said cage, a driven wheel constantly engaged by each of said driving wheels and rotatable therewith, means including a cup-shaped element rotatably supporting said driving wheels and containing a plurality of friction shoes engageable with the inner cylindrical surface thereof constantly tending to lock said driving wheels to said driven wheel to establish a one-to-one speed ratio therebetween, and means responsive to the speed of said driving cage for supplementing the action of said friction device.

10. In a driving mechanism, a rotatable driving cage, a driven shaft, a plurality of driving wheels mounted on said cage, a driven wheel constantly engaged by each of said driving wheels and rotatable therewith, means including a plurality of friction shoes each of which is movable on a true radial line from the axis of one of said driving wheels to oppose rotation of all of said driving wheels relatively to said driven wheel, and means responsive to the speed of said driving cage for supplementing the action of said friction device, said last named means being integral with another of said driving wheels.

11. In a driving mechanism, a rotatable driving cage, a driven shaft, a plurality of driving wheels mounted on said cage, a driven wheel constantly engaged by each of said driving wheels and rotatable therewith, means including a plurality of friction shoes each of which is movable on a true radial line from the axis of one of said driving wheels to oppose rotation of any of said driving wheels about their individual axes, and means responsive to the speed of said driving cage for supplementing the action of said friction device, said last named means being integral with another of said driving wheels.

12. In a driving mechanism, a rotatable driving cage, a driven shaft, a plurality of driving wheels mounted on said cage, a driven wheel constantly engaged by each of said driving wheels and rotatable therewith, means including a plurality of friction shoes each of which is movable on a true radial line from the axis of said driving wheels to lock said driving wheels to said driven wheel to establish a one-to-one speed ratio therebetween, and means responsive to the speed of said driving cage for supplementing the action of said friction device, said last named means being integral with another of said driving wheels.

13. In a driving mechanism, a rotatable driving cage, a driven shaft, a plurality of driving wheels mounted on said cage, a driven wheel constantly engaged by each of said driving wheels and rotatable therewith, means including a friction shoe which is movable on a true radial line and in a direction away from the axis of one of said driving wheels to oppose rotation of all of said driving wheels relatively to said driven wheel, and means responsive to the speed of said driving cage for supplementing the action of said friction shoe.

14. In a driving mechanism, a rotatable driving cage, a driven shaft, a plurality of driving wheels mounted on said cage, a driven wheel constantly engaged by each of said driving wheels and rotatable therewith, means including a friction shoe which is movable on a true radial line and in a direction away from the axis of one of said driving wheels to oppose rotation of any of said driving wheels about their individual axes, and means responsive to the speed of said driving cage for supplementing the action of said friction shoe.

15. In a driving mechanism, a rotatable driving cage, a driven shaft, a plurality of driving wheels mounted on said cage, a driven wheel constantly engaged by each of said driving wheels and rotatable therewith, means including a friction shoe which is movable on a true radial line and in a direction away from the axis of said driving wheels to lock said driving wheels to said driven wheel to establish a one-to-one speed ratio therebetween, and means responsive to the speed of said driving cage for supplementing the action of said friction shoe.

16. In a driving mechanism, a rotatable driving cage, a driven shaft, a plurality of driving wheels mounted on said cage, a driven wheel constantly engaged by each of said driving wheels and rotatable therewith, and means including a cylindrical element concentric with one of said driving wheels and containing a friction shoe engageable with the inner surface of said cylindrical element to oppose rotation of all of said driving wheels relatively to said driven wheel.

ALBERT S. WALTON.